No. 778,197. PATENTED DEC. 20, 1904.
E. J. INGWERSEN.
GATE.
APPLICATION FILED OCT. 6, 1904.
NO MODEL.
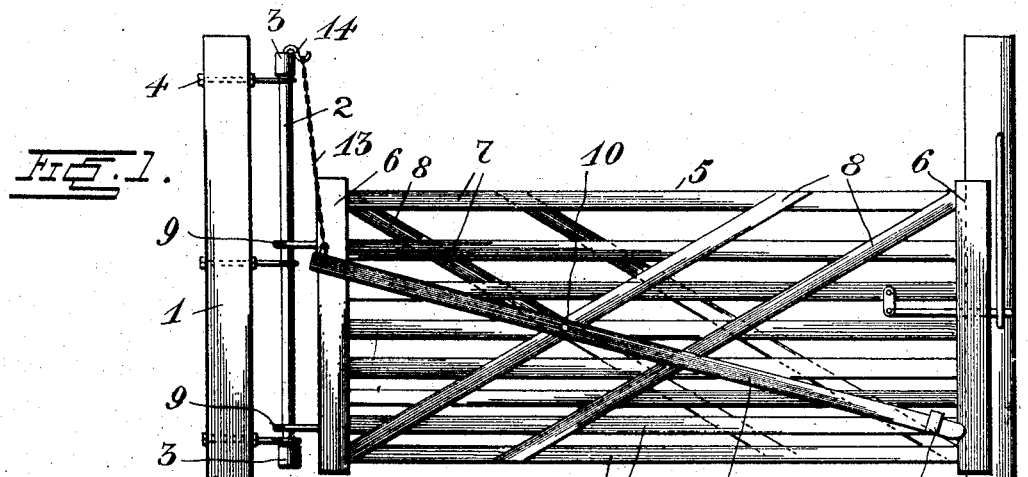
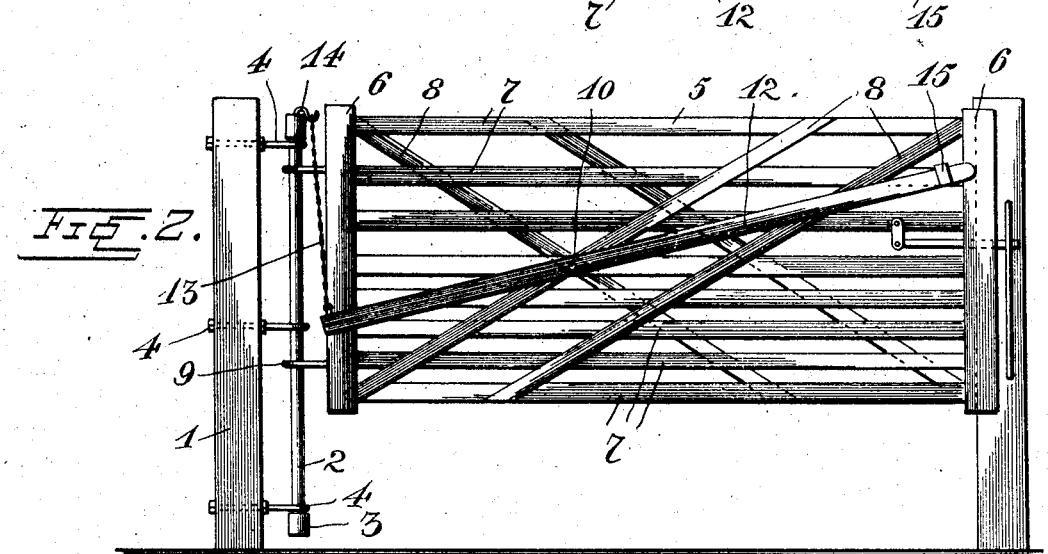
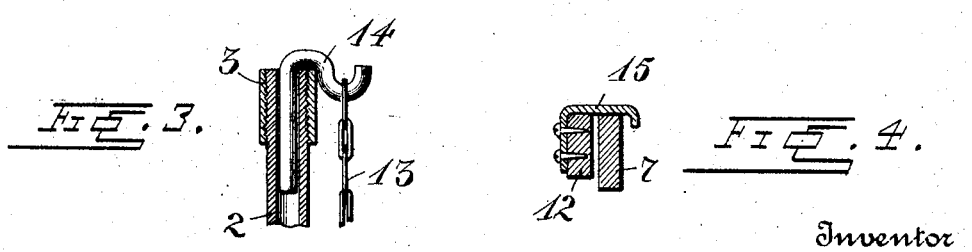
Witnesses
C. Munter
Q. H. Grinsbaum
Inventor
Edward J. Ingwersen
by H. R. Willson
Attorney No. 778,197. Patented December 20, 1904.

UNITED STATES PATENT OFFICE.

EDWARD J. INGWERSEN, OF LYONS, IOWA.

GATE.

SPECIFICATION forming part of Letters Patent No. 778,197, dated December 20, 1904.

Application filed October 6, 1904. Serial No. 227,460.

*To all whom it may concern:*

Be it known that I, EDWARD J. INGWERSEN, a citizen of the United States, residing at Lyons, in the county of Clinton and State of Iowa, have invented certain new and useful Improvements in Gates; and I do declare the following to be a full, clear, and exact description of the invention, such as will enable others skilled in the art to which it appertains to make and use the same.

This invention relates to improvements in swinging gates.

The object of the invention is to provide a gate of this character which may be quickly and easily raised or lowered to permit the same to be swung over snow or other obstacles or to permit of the passage of small stock, thereby facilitating the separation of the same from large stock.

A further object is to provide a gate of this character which will be simple, strong, and durable in construction, easily operated to raise and lower the same, and well adapted to the purpose for which it is designed.

With these and other objects in view the invention consists of certain novel features of construction, combination, and arrangement of parts, as will be hereinafter more fully described, and particularly pointed out in the appended claim.

In the accompanying drawings, Figure 1 is a side elevation of a gate constructed in accordance with the invention, showing the same in a lowered position. Fig. 2 is a similar view showing the gate in elevated position. Fig. 3 is a detail sectional view of the upper end of the hinge-bar; and Fig. 4 is a similar view through the outer end of the gate, showing the manner of connecting the outer end of the elevated lever with the same.

Referring more particularly to the drawings, 1 denotes a hinge-post, to which is connected a cylindrical hinge-bar 2. Said bar is preferably formed of a tube or pipe, on the upper and lower ends of which are screwed or otherwise secured heads or enlargements 3. The hinge-bar 2 is spaced from the post 1 and is preferably connected thereto by means of tie-bolts 4.

To the hinge-bar 2 is pivotally connected a gate 5, which may be of any suitable construction, but which is here shown as consisting of end bars 6, connected by parallel longitudinally-disposed rails 7 and by suitable brace-bars 8. To the inner end of the gate 5 are secured eyebolts 9, which are slidably engaged with the hinge-bar 2, thereby permitting said gate to be adjusted vertically on said bar.

Pivotally connected to the gate 5, as shown at 10, is an elevating-lever 12, to the inner end of which is secured the lower end of a chain or other flexible connection 13, the upper end of which is adjustably connected to a hook 14, which is pivotally mounted in the upper end of the bar 2. To the opposite end of the elevating-lever 12 is secured a laterally-projecting hook 14, which is adapted to be connected to one or the other of the longitudinal rails of the gate.

When it is desired to elevate the gate, the outer end of the bar 12 is raised, and when said gate has been elevated to the desired height said bar is connected, by means of the hook 14, to one of the longitudinal rails of the gate, thereby holding the same and the gate in its adjusted position. Should the gate 5 be constructed otherwise than shown in the drawings, suitable provision will be made for the attachment of the hook 14 at various points on the gate, thereby facilitating securing it at different heights.

Any suitable latch may be connected to the free end of the gate 5 to engage a keeper secured to a latch-post 15, whereby the gate may be held in a closed position.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

The combination with a suitably-mounted hinge-bar, of a gate adjustably hinged to said bar, an adjusting-lever pivotally mounted on said gate, a gate-supporting hook pivotally mounted in the upper end of said hinge-bar, a chain connected at one end to the inner end of said adjusting-lever and adapted to be adjustably engaged at its opposite end with said gate-supporting hook, and a hook arranged on the opposite end of said lever whereby said end may be connected to one of the rails of said gate thereby holding the same in an adjusted position, substantially as described.

In testimony whereof I have hereunto set my hand in presence of two subscribing witnesses.

EDWARD J. INGWERSEN.

Witnesses:
C. L. ROOT,
W. W. SCOTT.